Aug. 26, 1952 — H. E. DE PENNING — 2,608,310
DISCHARGE ELEVATOR FOR HARVESTERS
Filed Feb. 7, 1945 — 4 Sheets-Sheet 3

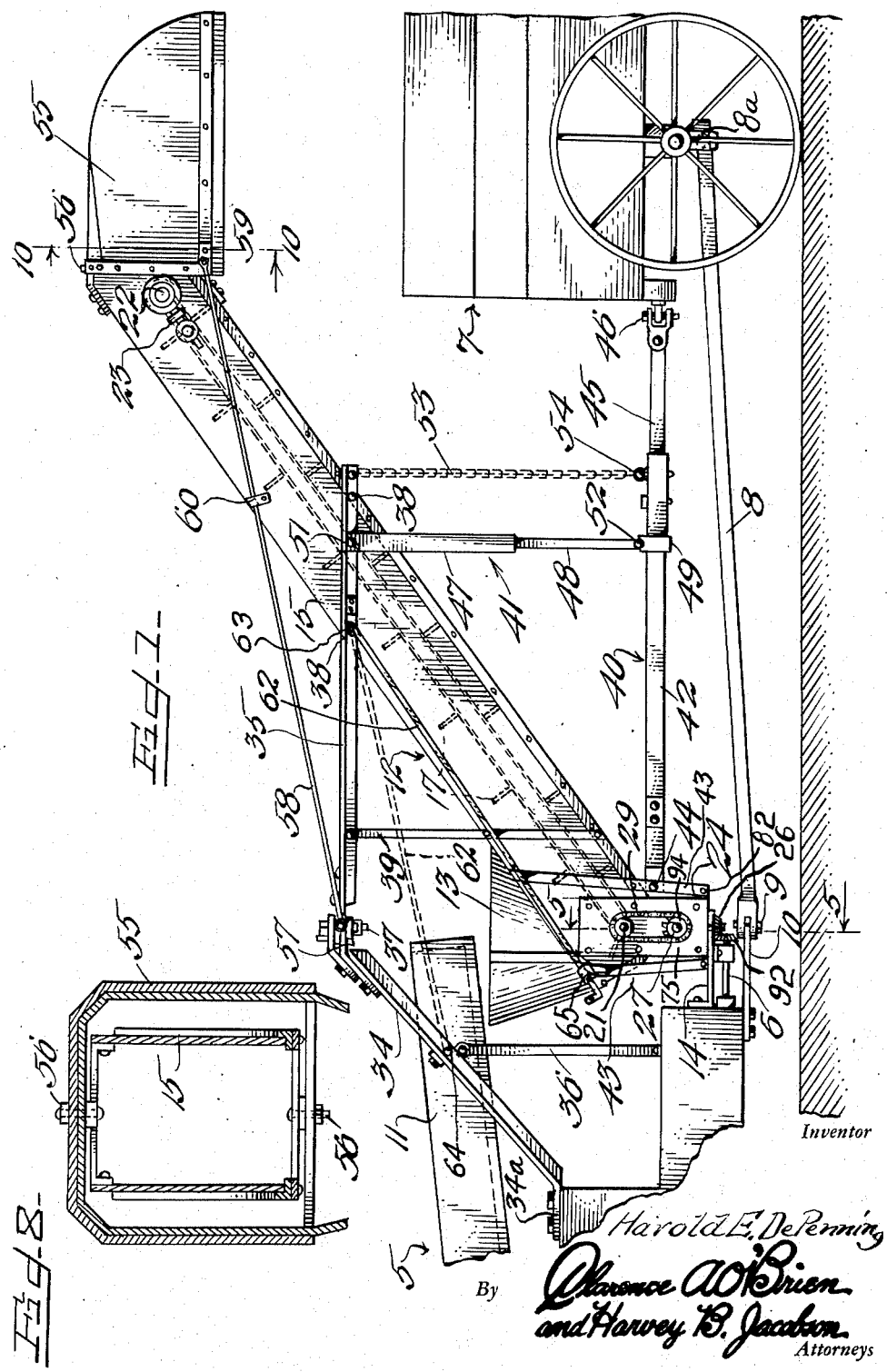

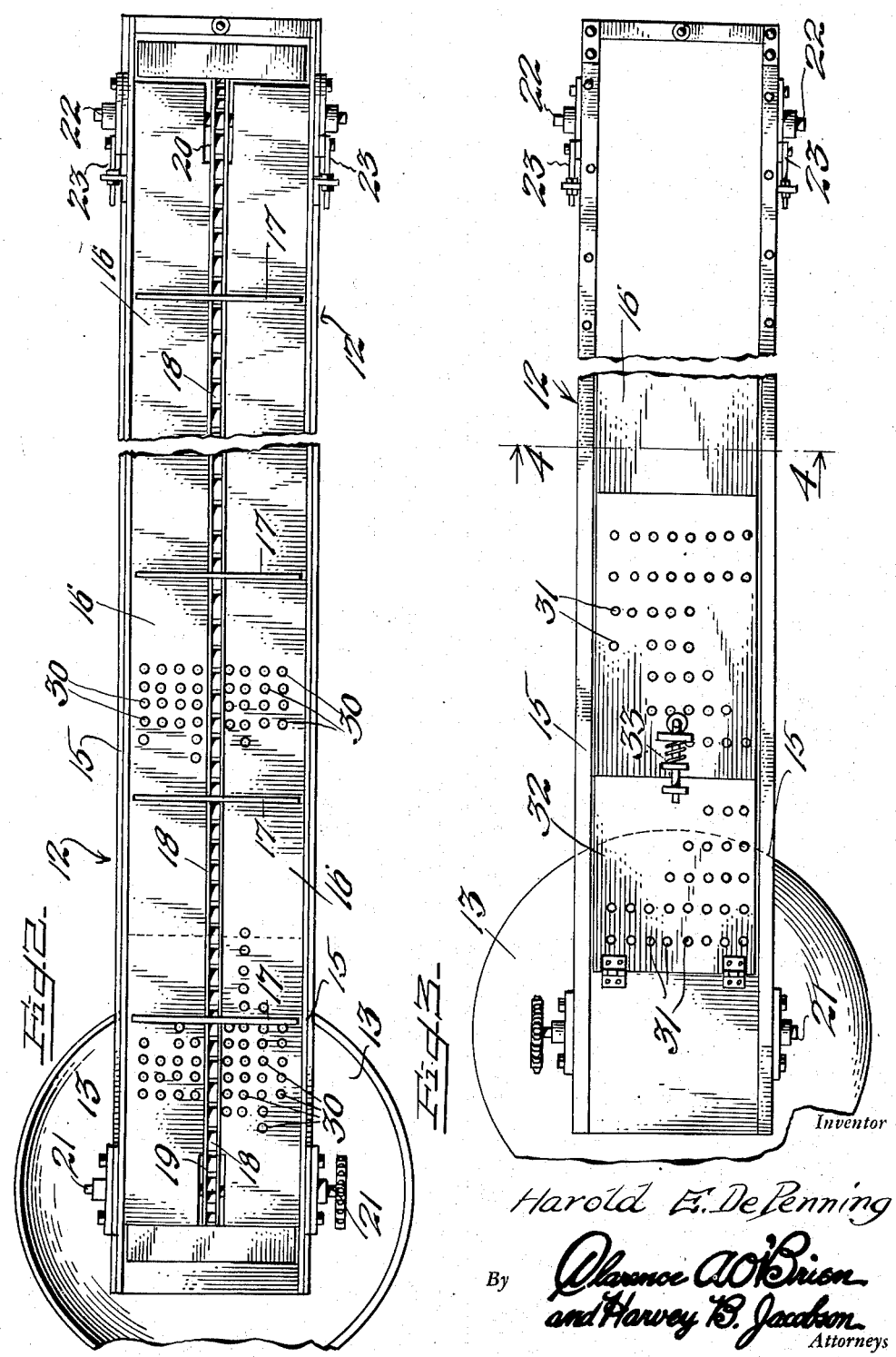

Inventor
Harold E. De Penning
By Clarence A. O'Brien
and Harvey B. Jacobson
Attorneys

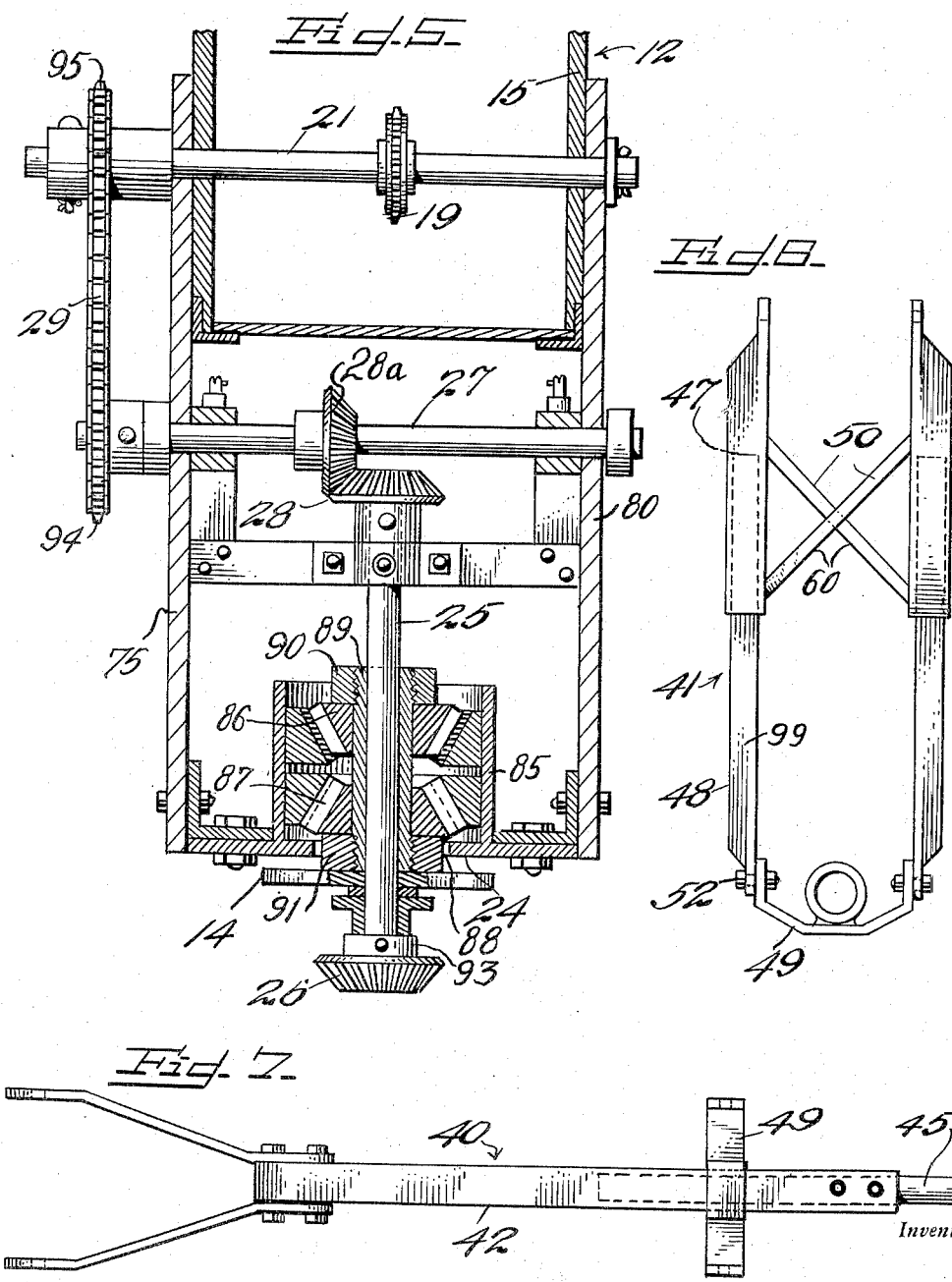

Patented Aug. 26, 1952

2,608,310

UNITED STATES PATENT OFFICE 2,608,310

DISCHARGE ELEVATOR FOR HARVESTERS

Harold E. De Penning, Newton, Iowa

Application February 7, 1945, Serial No. 576,641

4 Claims. (Cl. 214—42)

This invention relates to corn harvesters and the like, and has more particular reference to an improved discharge elevator for conveying the corn ears or the like from the harvester to a wagon which is drawn along at the rear of and by the harvester.

An important object of the present invention is to provide a discharge elevator of the above kind which is so mounted and connected to the wagon as to automatically swing laterally so as to follow the line of travel of the wagon when harvesting in curved rows.

Another object of the invention is to provide an elevator of the above kind including an elevating conveyor so mounted on the harvester and connected with the wagon as to swing vertically relative to the latter as required when the harvester passes over rises in the ground.

A still further object of the present invention is to provide an elevator of the above kind including an elevating conveyor, a laterally swinging hood carried by the discharge end of said conveyor for directing the corn ears or the like downwardly into the wagon, and means for automatically laterally swinging the hood in the direction in which the harvester is turned when steered to the left or right, so as to insure positive discharge of the corn ears or the like into the wagon even though the latter occupies a position to one side of the harvester as in moving around curves in curved rows.

Still another object of the invention is to provide a discharge elevator of the above kind which is comparatively simple and compact in construction, efficient in operation and adapted for ready manufacture and installation.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a fragmentary side elevational view illustrating the forward end portion of a wagon hitched to the rear end portion of a harvester, and showing the harvester equipped with a discharge elevator constructed in accordance with the present invention.

Figure 2 is a top plan view, partly broken away, of the conveyor forming part of the elevator.

Figure 3 is a similar bottom plan view thereof.

Figure 5 is an enlarged fragmentary vertical section taken substantially on line 5—5 of Figure 1.

Figure 6 is an elevational view of the telescopic unit for guiding the elevating conveyor in its vertical movements relative to the wagon.

Figure 7 is an enlarged fragmentary top plan view of the hitch pole which is connected with the wagon and forms part of means for causing the elevating conveyor to swing laterally so as to follow the path of travel of the wagon.

Figure 8 is an enlarged transverse section taken on line 10—10 of Figure 1.

Figure 9:
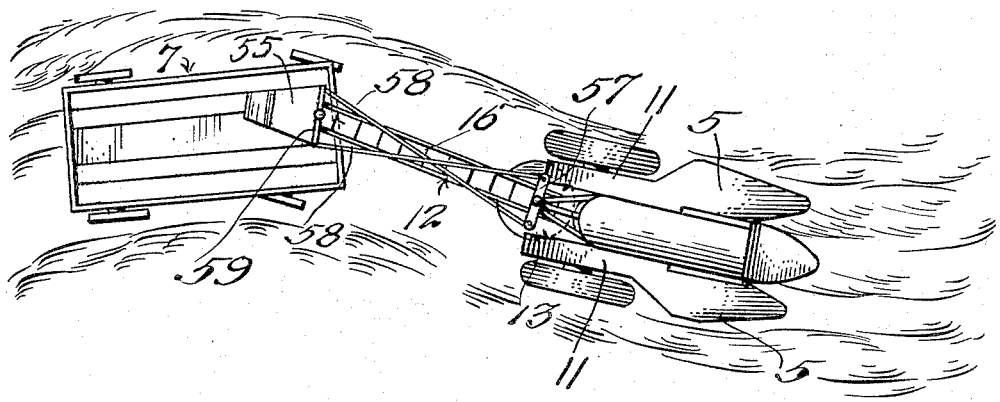
Figure 9 is a diagrammatic plan view illustrating the action of the elevating conveyor and hood in negotiating turns in curved rows.

Referring in detail to the drawings, 5 indicates a conventional corn or like harvester of the type embodying harvesting mechanism mounted upon an agricultural tractor 4 having a rearwardly extending power take-off shaft 6 (Fig. 1). An ordinary farm or grain wagon 7 of flare box type is towed at the rear of and by the tractor 4 and includes a tongue or draft member 8 pivotally connected, as at 9, to the drawbar 10 of the tractor for lateral swinging movement relative to the tractor. As is usual, the draft member 8 has its rear end pivoted at 8a to the front axle of the wagon 7 for vertical swinging movement. Also, the harvested corn ears or the like are discharged at the rear of the harvester from the husking rolls or rear conveyor means forming part of the harvester and generally denoted by the numeral 11.

The present invention provides an improved elevator for conveying the corn ears or the like from the harvester to the wagon 7, and this elevator includes a conveyor 12 which is supported in a rearwardly and upwardly inclined position and is provided at its forward lower end with a receiving hopper 13 in which the corn ears or the like are discharged from the rear conveyor means 11.

The conveyor 12 (Fig. 2) is preferably of a chain and scraper type, and includes a trough 15, a partition 16 spaced from and parallel with the bottom of the trough 15, and scraper plates 17 carried by an endless chain 18 which is movable rearwardly and upwardly along the upper surface of the partition 16 and forwardly and downwardly beneath such partition. The chain 18 passes around sprocket wheels 19 and 20 mounted on a foot shaft 21 and a head shaft 22, respectively, of the conveyor. Any conventional means may be provided at 23 for adjusting the head shaft 22 longitudinally of the trough 15 to provide for a desired tension of the chain 18.

The partition 16 is provided near its lower end portion with perforations 30 through which dirt and the like may readily pass on to the bottom of the trough 15. The bottom of the trough 15, below the perforations 30, is also provided with perforations 31 (Fig. 3) through which dirt and the like may pass and fall on to the ground. In order to permit cleaning of larger particles of dirt and trash from the trough, the lower portion of its bottom wall includes a hinged section or trap door 32 that may be swung downwardly to open position and which is releasably held in a raised position by means of a spring projected latch 33.

The forward end of the conveyor 12 (Figs. 1 and 5) is supported from the rear end of the tractor 4 by means including a bracket 14 which is carried on and extends rearwardly from the tractor. Arranged at opposite sides of the lower end of the conveyor 12 are a pair of downwardly projected bearing plates 75 and 80. Connected between the lower ends of the bearing plates 75 and 80, through the provision of angle members 81 and bolts 82, is a horizontal bearing plate 24.

The horizontal bearing plate 24 (Fig. 5) is integrally formed at its central portion with an upstanding circular wall or housing 85 for receiving a pair of reversely acting thrust bearings 86 and 87. Journaled within the bearings 86 and 87 and projected downwardly through an opening 88 formed in the bearing plate 24, is a sleeve bearing 89 for a conveyor drive shaft 25. The thrust bearings 86 and 87 are retained within the housing 85 by retaining nuts 90 and 91 threadable at opposite ends of the sleeve bearing 89, and with the lower retaining nut 91 being located within the opening 88 in a supported position on the bracket 14. It is seen, therefore, that the conveyor is supported on the bracket 14 through the bearings 86 and 87 and the lower retaining nut 91, for rotatable movement in a horizontal plane about the upright shaft 25 as an axis. The shaft 25 is maintained against axial movement by retaining collars 93.

A bevel gear 26 (Fig. 1), at the lower end of the conveyor drive shaft 25, is adapted for meshing engagement with a bevel gear 92 on the tractor power take-off shaft 6. The upper end of the drive shaft 25 carries a bevel gear 28 which is in meshing engagement with a bevel gear 28a mounted on an idler shaft 27. The shaft 27 extends transversely of the conveyor 12 and has its opposite ends rotatably supported in the bearing plates 75 and 80. Mounted at one end of the shaft 27, at a position outwardly from the bearing plate 75, is a sprocket gear 94 which is connected through a chain 29 with a sprocket gear 95 carried on the foot shaft 21. Power from the take-off shaft 6 is thus transmitted through the bevel gears 26 and 92, shaft 25, gears 28 and 28a, idler shaft 27 and gears 94 and 95 to the foot shaft 21, which drives the conveyor chain 18.

The conveyor 12 is supported in a desired inclined position by means including a forward frame section 34 and a rear frame section 35. The forward frame section 34 is rigidly mounted at 34a upon the rear end of the tractor 4 and is supported in a rearwardly and upwardly inclined position by brace members 36. The forward end of the rear frame section 35 is pivoted at 37 to the rear end of the forward frame section 34 for pivotal movement about a vertical axis coincident with the shaft 25 about which the conveyor 12 is adapted to swing laterally. The connection of the frame sections 34 and 35 with each other is such as to maintain them at all times in the same angular relation, with the section 35 being normally substantially horizontal and rigidly secured at its rear end to the sides of the conveyor 12, as at 38. A brace 39 is connected between the trough 15 and the rear frame section 35.

In order to accomplish a lateral swinging movement of the conveyor 12 relative to the harvester 5, or tractor 4, such that the conveyor 12 follows the path of travel of the wagon 7, and to also permit a free relative upward movement between the conveyor 12 and the wagon 7, a telescopic hitch pole 40 is connected between the forward end of the wagon 7 and the forward portion of the conveyor 12. The telescopic hitch pole 40 (Figs. 1 and 7) includes an outer section 42 which has its forward end pivoted at 44 on upright bars 43 arranged at opposite sides of the conveyor trough 15 and connected between the forward end of the trough 15 and the rear ends of the angle members 81. The pivots 44 permit a change in the angular relation between the conveyor 12 and the hitch pole 40. An inner telescoping section 45 for the pole section 42 has its rear end coupled at 46 to the front end of the wagon 7 for free vertical and horizontal swinging movement relative to the wagon.

An upright telescopic unit 41 (Figs. 1 and 6) is connected between an intermediate portion of the conveyor 12 and the rear end portion of the section 42 of the hitch pole 40. The unit 41 includes a substantially U-shape member 99 having a base section 49 welded to the section 42 of the hitch pole 40. The base section 49 is pivotally connected with the legs 48 of the U-member 99 by bolts 52. Arranged in a straddling relation with the trough 15 is a pivoted frame structure 50 which includes a pair of transversely spaced upright members 47 connected together by brace members 60. The upper ends of the members 47 are pivoted at 51 on the rear frame section 35 while their lower ends are adapted to receive, in a freely telescopic relation, the leg members 48 of the U-member 99. The telescopic unit 41 is thus freely extensible and collapsible with the pivots 51 and 52 permitting a change in the angular relation between the unit 41 and the rear frame section 35 and hitch pole 40.

From the above description it will be seen that when a wagon 7 is located to one side of the harvester 5, as in negotiating curves and rows (Fig. 9), the hitch pole 40 will swing laterally with the wagon to provide for the conveyor 12 swinging in a similar direction and to a similar extent so that the conveyor will be properly disposed to discharge the harvested grain into the wagon at all times. This lateral motion of the pole 40 is transmitted to the conveyor 12 through the telescopic unit 41. Also when the harvester travels over uneven ground, it is necessary that upward relative movement take place between the conveyor 12 and the wagon 7, as is diagrammatically illustrated in Fig. 10, for a travel of the harvester over a rise in the ground surface. This relative movement is permitted by the action of the telescopic unit 41 in a manner which is believed to be apparent. When the harvester passes over a rise in the ground surface the rear frame section 35 assumes an upwardly and rearwardly inclined position causing the conveyor 12 to move upwardly therewith. As the harvester reaches level ground again, the conveyor 12 is lowered with the frame section 35 by the collapsing action of the telescopic unit 41.

To support the hitch pole 40 against lowering on to the ground when a filled wagon is uncoupled from the tractor and a new wagon is to be substituted therefor, a chain 53 may be attached to the rear end of the frame 35 and to a connecting ring 54 secured to the section 42 of the pole 40, as shown for the chain in dotted lines in Fig. 1. After the pole 40 has been coupled to the empty wagon, the chain 53 is disconnected from the ring 54 and is hung from the frame section 35, as shown in full lines in Fig. 1, so as to permit a free up and down movement of the pole 40 and a free telescopic action of the unit 41.

A hood 55 is pivotally mounted at 56 upon the rear discharge end of conveyor 12 for lateral swinging movement relative to the latter. This hood is closed at the sides and top and open at the front and bottom to respectively communicate with the conveyor 12 and with the wagon 7. In other words, the corn ears or the like which discharge from the upper end of conveyor 12 are directed rearwardly and downwardly by the hood 55 into the wagon 7.

Figure 10:
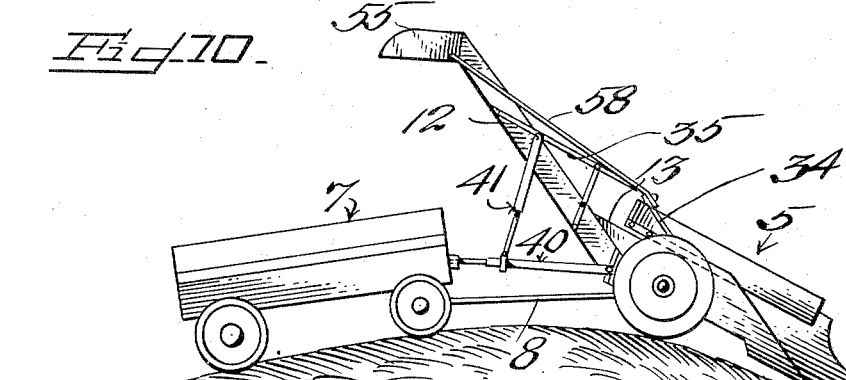
Figure 10 is a diagrammatic side elevational view illustrating the action of the elevating conveyor in swinging upwardly relative to the wagon when passing over rises in the ground.
Figure 4:
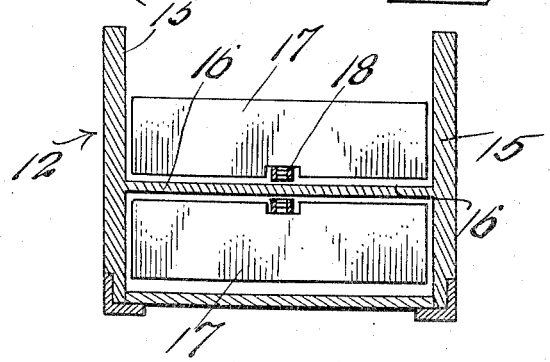
Figure 4 is an enlarged transverse section taken substantially on line 4—4 of Figure 3.

Means is provided for automatically swinging the hood 55 laterally in the direction corresponding to that in which the harvester is turned when negotiating curves in rows. For this purpose, a stationary cross bar 57 is provided on the rear end of frame section 34, and the forward ends of cables 58 are connected to opposite end portions of the cross bar 57. As shown in Figure 9, the cables 58 are crossed above the conveyor 12 and have their rear ends respectively connected to lateral arms 59 fixed to and projecting from opposite sides of the forward end of hood 55. It will thus be seen that when the harvester is steered laterally in either direction, a pull will be exerted on one cable 58 while corresponding slack will be provided in the other cable so as to cause the hood 55 to swing laterally in the same direction as that toward which the harvester is steered. This keeps the hood over the wagon body instead of allowing it to project beyond a side of the latter, thereby insuring that the corn ears will be directed into the wagon body instead of onto the ground at one side of the latter. This operation is clearly diagrammatically illustrated in Figure 9, wherein it is shown that the wagon will occupy a position to one side of the harvester in negotiating the curve. Suitable guides 60 may be provided on opposite sides of the conveyor 12 for the cables 58, and the cross bar 57 may be provided with a series of openings 61 in the opposite end portions thereof so that the point of connection of the cables 58 with said cross bar 57 may be adjusted to cause the proper degree of lateral swinging movement of the hood 55.

From the foregoing description, it is believed that the construction and operation, as well as the advantages of the present invention, will be readily understood and appreciated by those skilled in the art. As the harvester moves ahead, the operator may cause the power take-off shaft 6 to be driven so that the power will be transmitted to the endless member of the conveyor 12 through the gearing described. As the corn ears are discharged at the rear of the harvester into the hopper 13, they are conveyed rearwardly and upwardly by the conveyor 12 and discharged into the wagon 7. The manner in which the conveyor is caused to swing laterally and the manner in which the hood 55 is similarly swung, as well as the purposes thereof, have already been set forth.

When traveling from one point to another and not harvesting and loading corn, the wagon 7 will not be hitched to the harvester and pole 40 will be supported by chain 53. At this time, the conveyor 12 is held in line with the harvester and against swinging laterally relative to the latter by rods 62 hinged to opposite sides of frame section 35 at 63 and detachably engageable with frame section 34 at 64. When not in use, rods 62 may be swung down along opposite sides of conveyor 12 and engaged under clips or clamps 65 carried by the latter, as shown in Figure 1.

It will be understood that the embodiment of the invention illustrated and described is simply disclosed by way of example. In other words, the invention is susceptible of many modifications, and the details of construction may be widely varied without departing from the spirit and scope of the invention as claimed. Obviously, the details of the gearings used, the specific structure of the various elements, and the particular hood-swinging means may be changed to an extent such as fairly permitted within the spirit and scope of the invention as claimed.

What I claim as new is:

1. For use with a harvesting machine having an upwardly and rearwardly inclined elevator pivoted at its lower end on said machine for transverse pivotal movement and a wagon connected by a draft member to said machine in a trailing relation, the means for pivotally moving said elevator to maintain the upper end thereof above said wagon during a turning movement of said machine comprising a telescopic connection movably connected to said machine and said wagon, a pivoted frame structure extended longitudinally of said machine, means pivotally supporting the forward end of said frame structure on said machine for pivotal movement transversely of said machine about an axis coincident with the axis for said elevator, means connecting the rear end of said frame structure with said elevator, and means connecting said elevator with said telescopic connection for transverse pivotal movement together and for relative up and down movement.

2. For use with a harvesting machine having an upwardly and rearwardly inclined elevator pivoted at its lower end on said machine for transverse pivotal movement and a wagon connected by a draft member to said machine in a trailing relation, the means for pivotally moving said elevator to maintain the upper end thereof above said wagon during a turning movement of said machine comprising a telescoping connection movably connected to said machine and said wagon, means supporting said elevator in an inclined position including an upwardly and rearwardly inclined frame structure mounted on said machine, a pivoted frame unit extended longitudinally of said machine having its front end pivotally supported on the rear end of said inclined frame structure for pivotal movement transversely of said machine about an axis coincident with the axis for said elevator, means connecting the rear end of said pivoted frame unit with said elevator, and an upright telescoping unit pivotally connected between said telescopic connection and said elevator.

3. In combination with a harvesting machine connected by a draft member with a wagon and having an upwardly and rearwardly extended elevator supported at its lower end on the harvesting machine for pivotal movement transversely of the machine, a hood member pivotally mounted on the upper end of said elevator for transverse pivotal movement for directing material discharged from the elevator into the wagon, a telescopic connection movably connected to the machine and said wagon, means connecting the elevator with said telescopic connection for transverse pivotal movement in response to a transverse swinging movement of said telescopic connection, and means responsive in operation to a turning movement of the machine for pivotally moving said hood in the same direction as the elevator is pivotally moved relative to the machine.

4. For use with a harvesting machine having an upwardly and rearwardly inclined elevator pivoted at its lower end on said machine for transverse pivotal movement and a wagon connected by a draft member to said machine in a trailing relation, the means for pivotally moving said elevator to maintain the upper end thereof above said wagon during a turning movement of said machine comprising a telescoping hitch pole movably connected to said machine and said wagon, and means connecting said elevator with said hitch pole for transverse pivotal movement together and for up and down movement of said hitch pole relative to said elevator.

HAROLD E. DE PENNING.

REFERENCES CITED

The following references are of record in the file of this patent:

UNITED STATES PATENTS

| Number | Name | Date |
|---|---|---|
| Re. 21,542 | Oehler et al. | Aug. 27, 1940 |
| Re. 22,279 | Hyman et al. | Mar. 3, 1943 |
| 900,287 | Knapp | Oct. 6, 1908 |
| 1,016,740 | Ellison | Feb. 6, 1912 |
| 1,729,648 | Mitchell | Oct. 1, 1929 |
| 1,842,399 | Ghent | Jan. 26, 1932 |
| 1,945,119 | Metcalf | Jan. 30, 1934 |
| 2,335,924 | Elholm | Dec. 7, 1943 |